Nov. 25, 1969 L. KATZMAN ET AL 3,480,001
BOTTLE WARMER ATTACHMENT FOR VAPORIZER
Filed Jan. 25, 1968
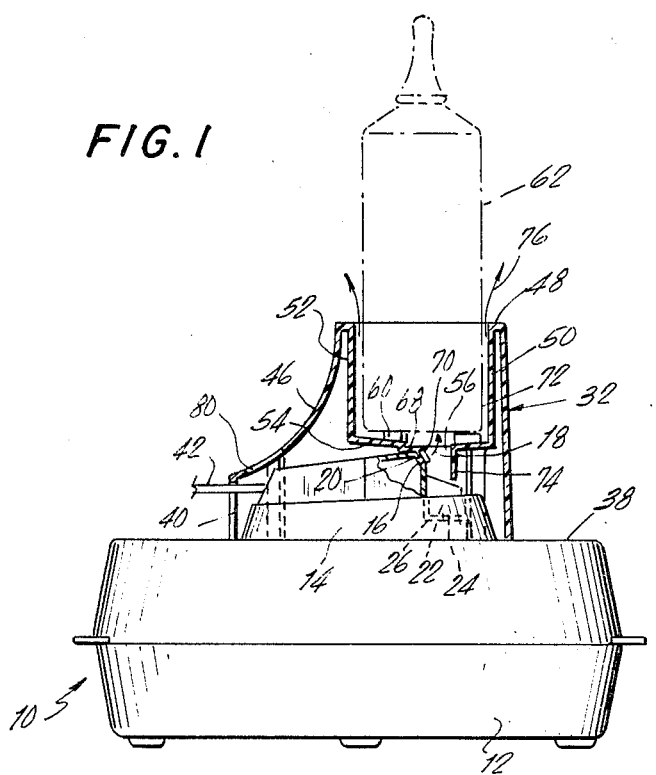
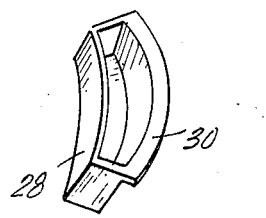
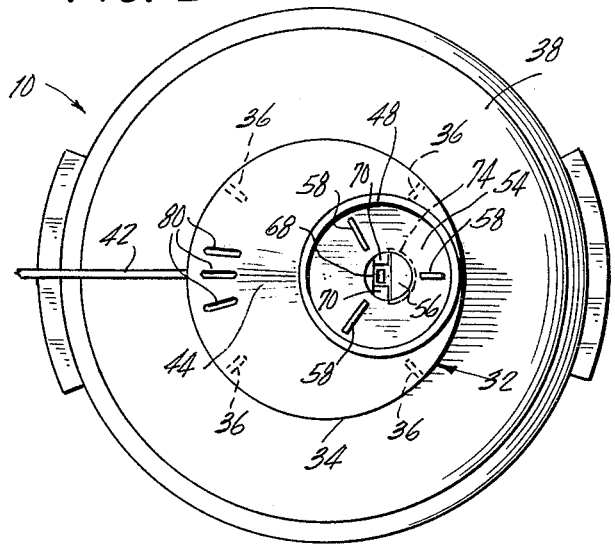
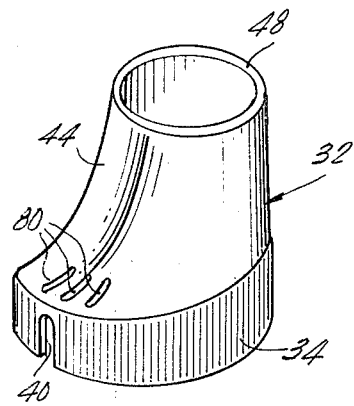
INVENTORS
LAWRENCE KATZMAN
EDWARD BRIGGIN
BY
Kenneth S. Goldfarb
ATTORNEY United States Patent Office 3,480,001
Patented Nov. 25, 1969

3,480,001
BOTTLE WARMER ATTACHMENT FOR VAPORIZER
Lawrence Katzman, New York, and Edward Briggin, Brooklyn, N.Y., assignors to Kaz Manufacturing Co., Inc., New York, N.Y., a corporation of New York
Filed Jan. 25, 1968, Ser. No. 700,504
Int. Cl. A47g 23/04; F24d 1/00; F22b 1/28
U.S. Cl. 126—261
7 Claims

ABSTRACT OF THE DISCLOSURE

A baby bottle warmer for use in combination with a vaporizer having a container and a steam heating assembly provided with a steam emitting head mounted on said container. The steam emitting head is provided with a steam outlet. An adapter is seated on the head and includes wall means forming a baby bottle receiving chamber extending above the head and having support means for engaging the bottom of a baby bottle. The support means has an opening therein communicating with the steam outlet for heating a baby bottle by steam.

---

This invention relates to an attachment for a steam vaporizer and more particularly to a baby bottle warmer.

Various types of baby bottle warmers have been developed in the past which for the most part employ means for heating water in which the baby bottle is subsequently immersed. It generally requires a considerable period of time to sufficiently heat the water to the extent where a baby bottle will subsequently be heated satisfactorily. Furher, when the baby bottle is immersed directly in the heated water, very often the temperature differential will cause cracking of the baby bottle. In addition, the open surface of boiling water is a considerable hazard.

The present invention eliminates the difficulties and dangers arising from the immersion of a baby bottle in a container of water by utilizing a steam vaporizer and an adapter combination therewith which provides means for securely and safely seating a baby bottle and also directing steam across the bottom thereof and along the lower portions of the sides and upwardly to quickly, conveniently, and safely heat a baby bottle.

It is an object of the present invention to provide means for use in combination with a steam vaporizer to safely and rapidly heat a baby bottle.

It is a further object of the present invention to provide an adapter which includes novel means for overlying and surrounding the steam emitting head of a vaporizer and for conveniently directing steam emitted by the vaporizer upwardly against the under surface and sides of a baby bottle.

Still further objects and features of this invention reside in the provision of a bottle warmer that is capable of being utilized with a steam vaporizer, which is simple in construction and manufacture, capable of being made out of materials which are easily cleaned, durable, and which is substantially foolproof and extremely safe to use.

These, together with the various ancillary objects and features of the present invention, which will become apparent as the following description proceeds, are attained by this bottle warmer attachment for vaporizers, which is illustrated in the accompanying drawing, by way of example only, wherein:

FIG. 1 is a vertical sectional view through the adapter as mounted on a steam vaporizer in combination therewith, with the vaporizer being shown in elevation and with parts broken away and shown in section for clarity;

FIG. 2 is a top plan view of the baby bottle warmer;

FIG. 3 is a perspective view of the attachment; and

FIG. 4 is a perspective view of a medical cup used in conjunction with the vaporizer.

With continuing reference to the accompanying drawing, wherein like reference numerals designate similar parts throughout the various views, reference numeral 10 is used to generally designate a steam vaporizer. This steam vaporizer may be generally of the type disclosed in the patent to Lawrence Katzman and Edward Briggin, No. 3,319,046, issued May 9, 1967 and includes a bowl or container 12 on which there is seated a steam emitting head 14 which has depending therefrom a suitable electrode and heating chamber substantially instantaneously heating water passing from the container 12 into the heating chamber to change the water into steam, which is thence emitted through a steam outlet 16 in the direction of arrow 18. The steam outlet 16 is formed in the angularly extending surface 20 of the steam emitting head 14 which when the steam vaporizer is used solely as a vaporizer will direct the steam upwardly and outwardly in a convenient and safe manner.

The steam emitting head is provided with a depression 22 therein in the location where heretofore medicine could be disposed so that the steam passing through the outlet 16 would pick up the aromatic medicine and direct it toward the user. In accordance with the present invention, a bore 24 is provided in the bottom wall 26 of the depression for feeding condensate into the container 12. When it is desired to utilize the vaporizer for therapeutic purposes, a medicine cup 28 which is removable from the vaporizer is detachably secured in the depression 22. The medicine cup 28 is provided with a lip 30 for stability in locating the medicine cup in the depression 22 and for enabling the convenient removal thereof.

An adapter generally indicated at 32 is provided and has cylindrically extending lower side walls 34 which are adapted to surround the steam emitting head 14. Four seating flanges 36 are integrally formed with the adapter 32 for enabling the side walls 34 of the adapter to seat on the upper surface 38 of the container 12. An opening 40 is formed in the side walls 34 to permit the electric cord 42 to connect the steam emitting head 14 and electrodes thereof to a source of electrical power.

The upper side walls 44 thereof are configurated so that an arcuately concave portion 46 thereof reduces the dimensions of the upper side walls 44 so that the upper portions are considerably less dimensions than the lower side walls 34. Integrally formed with the upper side walls 44 is a peripheral ring 48 from which a chamber 50 integrally depends. The chamber 50 includes cylindrical side walls 52 and a downwardly and inwardly tapered but substantially horizontal plate 54 which has an opening 56 therein. The plate 54 has three ribs 58 which extend upwardly therefrom and are annularly spaced and extend radially of the plane 54 and have horizontal upper surfaces 60 for engaging the bottom of a baby bottle 62 and for spacing the bottom of the baby bottle 62 above the plate 54. A flange 68 is provided for seating on the upper surface of the steam emitting head 54 and has a pair of fingers 70 which extend on either side of the steam emitting outlet 16 and lie flush against the angularly extending portion 20 of the steam emitting head. This flange 68 serves to provide for secure seating of the adapter 32 and for guiding of the steam into the chamber 72 in which the baby bottle 62 is received. An arcuate baffle 74 spaced from the flange 68 extends downwardly below the level of the steam outlet 16 and spaced therefrom for further aiding in directing the steam in the direction of the arrow 18 and thence beneath the base of the baby bottle 62 and along the sides thereof in the direction of arrows 76.

In use, with the vaporizer operatively electrically connected to a source of electrical current, it is merely necessary to turn the vaporizer on, whereby steam will substantially instantaneously pass into the chamber 72 and heat the baby bottle disposed therein in a quick, efficient, and safe manner. Any steam which condenses on the baby bottle or elsewhere will fall back down through the opening 56 due to the taper of the plate 54 into the depression 22 and thence back through bore 24 into the container 12. Safety vents 80 are provided and further safeguard the baby bottle as well as serve a decorative purpose. When it is desired to use the device solely as a vaporizer, the adapter 32 may be simply lifted off. If it is desired to use the device with medication, the medication cup 28 is utilized.

A latitude of modification, substitution and change, is intended in the foregoing disclosure, and in some instances some features of the present invention may be employed without a corresponding use of other features. Accordingly, it is appropriate that the appended claims be construed broadly and in a manner consistent with the spirit and scope of the invention herein.

We claim:

1. A baby bottle warmer in combination with a vaporizer having a container and a steam heating assembly provided with a steam emitting head mounted on said container, said steam emitting head being provided with a steam outlet, comprising an adapter overlying said head and including wall means forming a baby bottle receiving chamber extending above said head and having support means for engaging the bottom of a baby bottle, said support means having an opening therein communicating with said steam outlet, said support means including downwardly extending flange means at least partially surrounding said steam outlet.

2. A baby bottle warmer according to claim 1 wherein downwardly extending flange means engages said steam emitting head.

3. A baby bottle warmer according to claim 9, wherein said support means includes downwardly depending baffle means spaced from said flange means for directing steam through said opening.

4. A baby bottle warmer in accordance with claim 3, wherein said support means includes a plate having a plurality of upwardly extending ribs for holding a baby bottle above said plate to allow steam passing through said opening to pass beneath a baby bottle.

5. A baby bottle warmer according to claim 4, wherein said head is provided with a depression therein, said depression being disposed below said opening, said head having bore means therethrough communicating said depression with said container for permitting condensate to flow from said depression into said container.

6. A baby bottle warmer according to claim 5, including a removable cup detachably disposed in said depression.

7. A baby bottle warmer according to claim 6, wherein said support means includes downwardly extending flange means at least partially surrounding said steam outlet and engaging said steam emitting head, said support means further having an arcuate downwardly extending baffle spaced from said flange means for directing steam through said opening.

References Cited

UNITED STATES PATENTS

| | | | |
|---|---|---|---|
| 1,785,438 | 12/1930 | Edlin | 126—261 |
| 1,828,628 | 10/1931 | Torgerson | 126—261 |
| 1,977,482 | 10/1934 | Klause. | |
| 3,351,737 | 11/1967 | Katzman et al. | 219—271 |

CHARLES J. MYHRE, Primary Examiner

U.S. Cl. X.R.

126—369; 219—271